(12) United States Patent  (10) Patent No.: US 8,191,324 B2
Wallin  (45) Date of Patent: Jun. 5, 2012

(54) MODULAR PRE-CAST COMPOSITE FLOORING PANEL AND FLOOR SYSTEM

(76) Inventor: Arne Wallin, Elmvale (CA)

( * ) Notice: Subject to any disclaimer, the term of this patent is extended or adjusted under 35 U.S.C. 154(b) by 0 days.

(21) Appl. No.: 12/670,182

(22) PCT Filed: Jul. 23, 2008

(86) PCT No.: PCT/CA2008/001343
§ 371 (c)(1),
(2), (4) Date: Jan. 22, 2010

(87) PCT Pub. No.: WO2009/012581
PCT Pub. Date: Jan. 29, 2009

(65) Prior Publication Data
US 2010/0229481 A1 Sep. 16, 2010

Related U.S. Application Data

(60) Provisional application No. 60/951,367, filed on Jul. 23, 2007.

(51) Int. Cl.
E04C 2/52 (2006.01)
(52) U.S. Cl. ....... 52/220.3; 52/169.5; 52/390; 52/591.4; 52/1
(58) Field of Classification Search ............... 52/169.5, 52/302.3, 389, 591.4, 390, 462; 428/156, 428/327
See application file for complete search history.

(56) References Cited

U.S. PATENT DOCUMENTS

| | | | | |
|---|---|---|---|---|
| 3,085,482 A * | 4/1963 | Yakubik | ......................... | 404/31 |
| 4,031,285 A * | 6/1977 | Miller et al. | ............... | 428/294.7 |
| 4,240,998 A * | 12/1980 | Lichter et al. | ................ | 264/45.4 |
| 4,562,109 A * | 12/1985 | Harvey et al. | ................ | 428/220 |
| 4,572,861 A * | 2/1986 | Barretto Garcia et al. | | 428/299.4 |
| 4,575,861 A * | 3/1986 | Levreault | ...................... | 375/343 |
| 4,843,786 A * | 7/1989 | Walkinshaw et al. | ........ | 52/169.5 |
| 5,137,764 A * | 8/1992 | Doyle et al. | .................... | 428/44 |
| 5,268,226 A * | 12/1993 | Sweeney | .................... | 428/312.4 |
| 5,362,560 A * | 11/1994 | Ehrhart et al. | ................ | 428/343 |
| 6,151,854 A * | 11/2000 | Gutjahr | ........................... | 52/385 |
| 6,270,016 B1 * | 8/2001 | Fiedrich | ......................... | 237/69 |
| 6,805,298 B1 * | 10/2004 | Corbett | ........................... | 237/69 |
| 7,021,372 B2 * | 4/2006 | Pickard | .......................... | 165/168 |
| 2004/0086678 A1 * | 5/2004 | Chen et al. | ..................... | 428/44 |

* cited by examiner

Primary Examiner — Brian Glessner
Assistant Examiner — Adam Barlow

(57) ABSTRACT

A multilayer flooring panel for flooring and the like has a cementitious top surface, a lower density intermediate layer preferably incorporating expanded polymeric beads mixed with cement, and a lower layer reinforced by tension-bearing fibers embedded therein. The interface between the top and middle layers may be upwardly domed to reduce the tendency for cracks to form in the bottom surface of the top layer. Channels formed along the edges of such tiles allow insertion of heat transfer tubing to provide a hydronic floor surface. A flooring panel may have cementitious top and bottom surfaces with an intermediate lower density layer there between. Such intermediate layer may be divided into two portions by a water impervious layer that serves as a binder and vapor barrier. Flooring panels provided with shiplap joints along the edges are laid-out on a prepared surface on mortar pads positioned along edges and corners of the tiles to provide flooring, leaving a continuous under air space which may be ventilated to remove moisture; soil gases and radon gas.

18 Claims, 7 Drawing Sheets

MODULAR PRE-CAST COMPOSITE FLOORING PANEL AND FLOOR SYSTEM

This application claims the benefit of provisional filing 60/951,367 filed Jul. 23, 2007.

FIELD OF THE INVENTION

This invention relates to the building industry. More particularly, it relates to a tile-like modular building element in the form of rigid flooring panels and systems for use in providing flooring based upon the use of cementitious materials such as precast concrete and the like.

BACKGROUND TO THE INVENTION

Flooring surfaces have been provided by laying flagstones and tiles since time immemorial. Nevertheless, new building materials have provided an opportunity to construct a new type of modular flooring element that incorporates both a durable surface substantially equivalent to that provided by concrete or cement, while at the same time providing the benefits of presently available expanded polymeric foams in terms of reduced weight and insulation.

Tile panels with a plastic foam core have been proposed. Wack et al., U.S. Pat. No. 3,817,012, describes a prefabricated ceramic tile with ceramic tile elements bonded to a foam backer formed from rigid closed-cell plastic foam. A fiber reinforced paper backing sheet (104 in FIGS. 4-7) is attached to the rear surface of the foam backer. The preferred material for the foam backer is polyurethane, which is foamed in place in a mold. The foaming process bonds the foam to the rear surface of the ceramic tile face. The fiber reinforced sheet added to the rear surface of the foam backer further strengthens the panel and permits the use of a relatively thin foam layer. The preferred material for the backing sheet is a kraft paper reinforced by a glass fiber scrim (106 in FIG. 7) which is affixed to the inner side of the paper by a thin polyethylene coating.

Angioletti, U.S. Pat. No. 4,415,616, describes a monolithic slab with a ceramic tile surface, polymeric grouting material between the tiles, and a synthetic resinous plate with a reinforcing fabric embedded in its rear face. The resinous plate has shavings distributed throughout the plastic. The product serves as a flooring material providing sound-proofing and waterproofing to the resulting floor. The resinous plate is preferably a microcellular polyurethane foam with an insulating material such as wood shavings or a vulcanized elastomer embedded in the matrix. A fabric scrim or net is embedded in the face of the plate opposite the tiles.

Winnick, U.S. Pat. No. 3,646,180, describes a foam-cored wall panel with two fiberglass layers. One such layer bonds a layer of ceramic tiles to the foam core. Preferably, relatively thin tiles are employed so that the panel can be suspended from the building studs as a unit. Flexible grout may be installed in the cracks between tile on the front or exposed tile layer surface of the panel. The panels are formed by placing a layer of tile face down in a mold and taping the joints formed by their abutting edges with adhesive tape. Next, a fiber-glass layer is applied to the tape-covered rear surface of the tile layer. The fiberglass material includes an adhesive or bonding agent such as a polyester resin which effects adhesion to the tile layer. To form the core, a closed cell foam plastic composition of polyurethane, polyethylene, or polystyrene is then introduced into the cavity over the cured fiberglass layer. After curing (at a controlled temperature) the foam core is smoothed and leveled by sanding. A second fiberglass layer carrying mounting means for anchoring or securing the wall panel to conventional construction is then applied to the exposed core surface. The panel thus comprises layers of tile, adhesive tape, fiberglass, foam core, and fiberglass.

Murphy, U.S. Pat. No. 3,362,119, describes a four-layer, pre-grouted tile panel. The panel has a layer of tiles, a layer of adhesive, a rigid base sheet layer, and a deformable backing layer. The tiles may be ceramic, and the base sheet is preferably asbestos fiber embedded in mineral cement. The readily deformable backing layer (15 in FIG. 3), preferably a plastic foam, comprises the rear layer of the panel.

Bartoloni, U.S. Pat. No. 3,521,418, describes a panel with a backing support made from fibrous material impregnated by a plastic resin. A plastic resin is interposed between the decorative tile facing and the backing support made from the fibrous material. A plurality of thin, elongated reinforcing strips or rods made from fiber glass may be immersed in the resin to provide reinforcement for the backing support.

McLauchlin U.S. Pat. No. 4,832,995 issued May 23, 1989 depicts a plurality of ceramic tiles pre-assembled and mounted on a water-resistant, non-stretchable backing sheet. The tile panels further include a non-stretchable facing layer which is releasably adherent to the faces of the tiles. The spaces between the tiles are filled with grout to seal these spaces against moisture, etc.

It is also known to combine cementitious tiles with heat transfer tubing positioned in grooves formed within the body of the tile surface to be used as part of a hydronic, heated/cooled floor surface, cf Corbett, U.S. Pat. No. 6,805,290. In other cases, such tubing has been positioned in gaps located between the edges of noncontiguous tiles, cf, Fiedrich, U.S. Pat. No. 6,152,377.

A need exists for a tile suitable for use as a floor surface which can be readily made from conveniently available materials and which is easy to install. It would also be desirable for such tile to accommodate thermal transfer tubing to serve as part of a hydronic heated/cooled floor surface. The present invention addresses such a need.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one aspect of the invention, a flooring panel, (also referred to hereafter on occasion as a "tile" although the flooring panel of the invention is distinct from standard tiles), which is suitable for use as a floor laid over a prepared earth base or layer of aggregate or gravel as a support surface is provided. Once installed on the cementitious mortar pads of the invention, such flooring panels are capable of performing as a complete finished floor within a structure, supporting, transferring and spreading all required traffic loads to the earth or layers of aggregate or gravel below. The flooring panel of the invention comprises at least three layers:

1) a cementitious upper layer providing a durable upper surface of a given density suitable for use as part of a floor surface;
2) an intermediate lower density layer beneath the upper layer containing lower density particulate material, preferably in the form of pellets of expanded polymeric resin beads or particles, bonded together by a higher density binder that forms a binder matrix containing and fixing the position of the low density particulate material, the overall average density of the intermediate layer being less than the density of the upper layer, and 3) a protective and tensile constraining lower layer located on the underside of the immediate layer, such lower layer being preferably reinforced by tension-bearing fiber-like or fibrous elements embedded therein.

The presence of lower density material in the intermediate layer, for a given weight of flooring panel, increases the thickness of the intermediate layer which functions as a web between the upper layer and the lower layer, rendering the panel more rigid. This improves the ability of flooring panel to carry a load on its upper surface. It also improves the insulation capacity of the flooring panel.

The upper layer has a density consistent with that of a cement and sand mix, e.g. a specific gravity of around 2.4. The intermediate layer may have an average specific gravity of around 1, preferably in the range 0.8 to 1.2 with 0.6 to 1.3 being possible when compromising weight, cost, and strength. Thus the density ratio of the intermediate layer (average density) with respect to the upper layer (average density) may typically range between 25% to 55%, preferably 30% to 50%, and more preferably within 5% to 40%.

Preferably, the binder for the intermediate layer is a cementitious binder. A cementitious layer or binder is a layer or binder containing calcium silicate. Preferably a cementitious layer or binder comprises Portland cement or a cementitious formula that performs in a similar manner. The lower layer may also comprise a cementitious binder.

The relative volumetric ratio of the lighter weight particulate matter with respect to the binder in the intermediate layer may be based on the use of standard commercially available polystyrene beads having a diameter on the order of 1-2 mm. and a typical cement mix based on Portland cement and sand having a specific gravity of 2.5. Preferably the binder in the intermediate layer binds readily with the material in the upper layer, e.g. both are cementitious, and sufficiently envelops the lighter weight particulate to form a structurally supporting matrix between the upper layer and the lower layer.

The lower layer is optionally but preferably cementitious as well, including chopped reinforcing fiber, e.g. nylon fiber, or a woven, nonwoven, scrim or other equivalent assembly of tension-bearing fibers to serve as reinforcement. Alternately, the lower layer may be based on a polymeric resin which contains the fiber reinforcement.

The lower layer, particularly if based on cementitious material, may finally be covered on its lower outer surface by a vapor seal optionally in the form of a vapor-impenetrable film such as a polymeric film—of biaxially oriented polyethylene terephthalate (boPET) polyester film of the type sold under the trademark "Mylar". Such a film may optionally, but preferably, be provided with a reflective coating to reduce heat transfer. Alternately a vapor seal for a finished tile may be provided by a painted-on sealant coating applied over the lower surface of the tile.

Optionally and preferably, the cementitious upper layer may be provided with a decorative pattern on its upper surface introduced by the inclusion of coloring media into the upper layer at the time of its formation. Further, such upper layer may comprise a limited quantity of expanded perlite or similar fine particulates such as silica fume in order to produce an improved finish. Additionally, use of a textured mold for the casting of the upper layer can produce a textured surface which further enhances the appearance of the decorative finish on the upper surface of tile and also contribute towards providing a non-slip finish.

According to a preferred feature of the invention, the interface between the top and intermediate layers in a finally formed tile is upwardly domed to reduce, in combination with the lower layer, the tendency for cracks to form within the higher of the two layers at such interface when a load is applied to the upper surface of the tile. The "domed" upper layer may also have it's top decorative surface also be slightly "crowned"—domed—by, for example a ³⁄₁₆" central elevation over the peripheral boundaries for a 24 inch square tile. This can be achieved by using a less than fully rigid mold and only supporting the mold around its perimeter so as to allow the mold surface to sag slightly in the center.

According to a further preferred feature of the invention, the interface between the intermediate and lower layers may also be upwardly domed to reduce, in combination with the lower layer, the tendency for cracks to form in the body of the higher of the two layers at such interface when a load is applied to the upper surface of the tile. The doming features as described may be provided by themselves or in combination with each other.

As an optional variation of the invention both the top and bottom layers of a composite tile can be cast in similar molds to serve as part of upper and lower half portions of the composite tile. Such eventual outer layers are each in the form of a cementitious layer containing fibrous reinforcement in the manner of a previously described lower layer. Different finishes within the respective forms, or different treatments as described previously, can provide differing decorative outer surfaces for each top layer of the respective composite portions. A layer similar to the intermediate layer is then formed over the cementitious outer layer of each tile portion while the outer layer is within its mold.

Once set, these two pieces can then be assembled with the "intermediate" layers bonded together by a central layer to form a composite tile which is reversible. Each piece is capable of serving as an upper or lower half. Advantageously, the central layer can be a vapor impervious layer in the form of a continuous sheet of waterproof binder (e.g. hot melt glue, epoxy, etc.) covering the interface between the two portions.

A composite tile as described provides design flexibility due to the ability to provide distinct reversible, outer, decorative finishes (i.e. texture, color, etc.) on the respective halves. By casting such a composite tile with a slightly thicker lower density, cumulative intermediate layer, the result is a tile which can have a greater insulation value.

Tiles made in accordance with the invention, when used to form a floor surface, may be installed by placing such tiles adjacent to each other over localized deposits of mortar-mix placed as support pads along the underlying bearing surface. Such deposits may be generally circular in form or may be linear, preferably being located so as to underlie a given tile at a location or locations just inwardly of the edges of such tile and preferably where corners of tiles meet. Such deposits are preferably located intermittently so as to leave an airspace there between which underlies the tiles in a contiguous manner. Such a contiguous under floor airspace may then be vented outside the structure for removal of harmful soil gases and cancer-causing radon gas.

Advantageously, the mortar-mix used to support the tiles may also incorporate pellets of expanded polymeric resin, e.g. polystyrene, which are bonded therein. The reduction of mortar content by this means allows for quicker setting of the mortar and shortens the time before the floor surface is able to support a load if less mortar is used in the tile-supporting deposits. If the same amount of mortar is employed for such deposits, then the presence in the mortar of pellets of expanded resin provides more support for the floor. The extension of the mortar mix with an insulative additive also further insulates the floor from the underlying support surface.

Tiles made in accordance with the invention preferably have interfitting edges allowing them to be assembled contiguously to each other with overlapping portions. According to one aspect of the invention, two adjacent edges of a rectangular tile may be respectively provided with either male or female indentations while the other two adjacent edges are provided with complementary indentations to serve as a joint, e.g. a shiplap or tongue-and-groove joint. Such edge treatment will, when the tiles are assembled, allow the edges of each tile to be interfitted with the edges of adjacent tiles, with portions of such edges either underlying or overlying portions of the edges of adjacent tiles.

Tiles made in accordance with the invention may have provision for a channel to be formed along one or two of the tile edges to receive thermal tubing, typically ½ inch inside diameter round plastic tubing, when laid to form a floor for hydronic radiant floor heating. Such tubing may be used to circulate a heat-exchange fluid and allow the floor to function in the manner of a hydronic floor heat exchange surface to provide radiant heating or cooling. With this objective, channels are provided having a width and depth sufficient to receive tubing, preferably tubing made of polymeric resin such as polypropylene, and a layer of covering grout. Such tubing may be pressed into the channel against a previously installed layer of flexible polymeric sealant applied to the adjacent overlapping tile edges. Such sealant serves to seal the joints between the tiles, providing a continuous seal against the migration of humidity through the floor surface. It also serves as a cushion beneath the thermal tubing accommodating, at least to a degree, thermal expansion of such tubing. A cementitious grout is used to cover the top portion of such tubing.

Both regular and composite tiles cast in accordance with the described procedures can include one or more channels cut, formed or cast into one of the outer surfaces intended as a top surface, adjacent to one or more edges. In the case of composite tiles, turning such a tile over can still present an upwardly directed channel to receive radiant heat tubing.

Optionally, channels may be formed on two orthogonal sides of a tile permitting radiant heat tubing to be installed in a crisscrossed fashion, doubling their effectiveness. Such a feature may be included on a standard tile or on the reversible finished upper surfaces of a composite tile.

Advantageously, flooring made in accordance with the system of the invention may be laid on a prepared earth base or foundation so as to serve as a cellar floor. Additionally, such a floor may be laid at other levels over existing flooring within a structure, enabling the convenient addition of a hydronic heating floor surface within a building that has already been erected.

When employed as a basement floor covering over a prepared earth foundation topped by a layer of aggregate, underfloor water drainage pipes may be installed in troughs beneath the gravel or aggregate layer to collect under floor water. These pipes may then direct collected water to a sump pump which will ensure that all such water is removed from beneath the floor. Similarly, the under tile airspace may be vented by a fan and outlet connected to the sump pump.

As an additional application, tiles according to the invention can be used out of doors as a walkway surface in a winter climate where the ground tends to freeze during the winter. By reason of the insulation present in each such tile, the tendency for frost to form beneath and disrupt such a walkway will be reduced.

The foregoing summarizes the principal features of the invention and some of its optional aspects. The invention may be further understood by the description of the preferred embodiments, in conjunction with the drawings, which now follow.

Wherever ranges of values are referenced within this specification, sub-ranges therein are intended to be included within the scope of the invention. Where characteristics are attributed to one or another variant of the invention, such characteristics are intended to apply to all other variants of the invention where such characteristics are appropriate or compatible with such other variants.

DESCRIPTION OF THE PREFERRED EMBODIMENT

Figure 1:
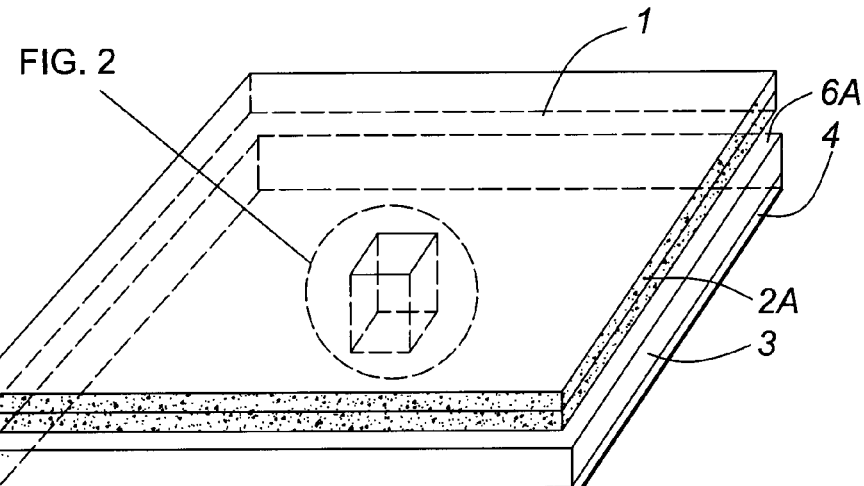
FIG. 1 is a perspective view of a flooring panel or tile made in accordance with the invention.
Figure 2:
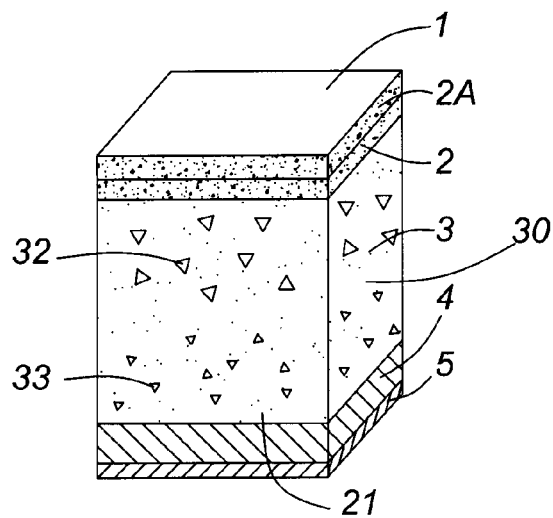
FIG. 2 is a perspective cross-sectional view taken through a portion of the tile of FIG. 1.

In FIGS. 1 and 2 a tile according to the invention has a cementitious upper layer 2 providing a durable upper surface 1; an intermediate lower density layer 3 containing pellets of lightweight fill, e.g. expanded polymeric resin pellets bonded together by a binder, and a bottom reinforcing lower layer 4 provided with tension-bearing fibers embedded therein. The upper layer 2 may be provided with a thin surface layer portion to serve as a decorative top layer 2A. The binder can be mortar or cementitious mix based on Portland cement and cement sand. A vapor barrier 5 preferably covers the lower surface of the lower layer 4.

Convenient dimensions for the respective layers, which are generally indicative of the range and relative proportions, are as follows:

1) decorative top layer 2A to provide the outer finish: ¼ to 1¼ inch
2) a similar underlying strong backup layer 2: e.g. ½ up to 1 inch.
3) light weight insulating layer 3:-1¼ to 2½
4) fiber mesh reinforced bottom layer 4:-5/16 to ½ inch. Thus a flooring panel, based on these sub-ranges, can preferably range from 2 5/16 inches up to 5¼ inches in thickness.

The tile of FIG. 1 is shown as having an upward facing ledge 6A along two adjacent sides, and a downward facing ledge 6B along the two other adjacent sides. In a preferred configuration designed to receive radiant heating tubing 9, the upper ledge 6A on a 24 inch square tile has a width of about 1 inch and the bottom ledge 6B has a width of approximately ⅞ inches.

Reverse relief angles of 4 to 10 degrees are preferably provided around the peripheral edges of the tiles by the mold (not shown). Such relief angles not only facilitate removal of the tiles from the mold but also become available for filling with grout 7 once the tiles have been installed as a floor. In the case of the two-piece composite tile made from the same common mold and described further herein below, only the periphery of the upper tile will normally be filled with grout 7.

The vapor barrier 5 adds virtually nothing to the overall thickness of the flooring panel. Conveniently and as an example, when supported by an under-tile layer of mortar of preferably ¾ inches in height (but possibly extending over a range of ½ inches to 1 inch to compensate for variations in the level of the prepared soil), a tile thickness of 3¼ inches can provide an overall floor height above the underlying support surface of 4 inches.

The upper layers 2, 2A may optionally be prepared according to the following formula (parts by volume):

Mix "A" Face and Back Up Layers.
16 parts sand
4 parts white Type 30 Portland
1 part perlite fume, all by volume
Use as little water possible for a uniform mix.

Inclusion of perlite fume dust in the formulation for the upper layers 2, 2A produces an improved finish and reduces the generation of dust off the upper surface 1.

Optionally, this layer may also include a range of ½ to 1½ ounces by weight of concrete reinforcing nylon fiber per cubic foot of mix.

To provide the cementitious upper layers 2, 2A with a decorative pattern on the upper surface the tile, the upper sub-portion top layer 2A may contain pigment that is stirred into the top layer 2A during casting to create a marble-like effect across the upper surface 1. Such a pigmenting composition may be made according to the following formulation:

Color Mix "B"
Using ten percent of Mix "A" add one teaspoon black pigment, e.g. carbon black, and stir to uniform mix.
Briefly stir into face mix. (uniform but incomplete)

The intermediate layer 3 will preferably incorporate expanded polystyrene beads embedded in a cementitious binder. Such beads may be reconstituted from scrap polystyrene product by agitating the scrap in turbulent water, as in a blender. The preferred binder for the intermediate layer 3 is a cementitious binder, more preferably described as follows:

Intermediate Mix "C"
12 parts sand
4 parts type 30 Portland
2 parts perlite fume
30 parts (recycled bead board ESP—expanded polystyrene beads—preferably recycled), all by volume. All quantities especially ESP, measured by volume include air between the particles.
Stir complete only enough water mixture to "clump" consistency.

The lower layer 4 which serves as a reinforcing skin is preferably manufactured according to the following formulation:

Mix "D" Reinforced Skin
1 parts Type S High Bond masonry cement
1 part Type 30 Portland
6 parts sand, all by volume.

1⅔ oz by weight concrete reinforcing nylon fiber per cubic foot of mix.
Add water to mixture to produce a spreadable mortar consistency.

Optionally, the lower layer 4 may be covered on its lower side by a vapor barrier 5 which may be in the form of a vapor-impenetratable preformed film or an equivalent film applied as a liquid and subsequently "set".

Figure 5:
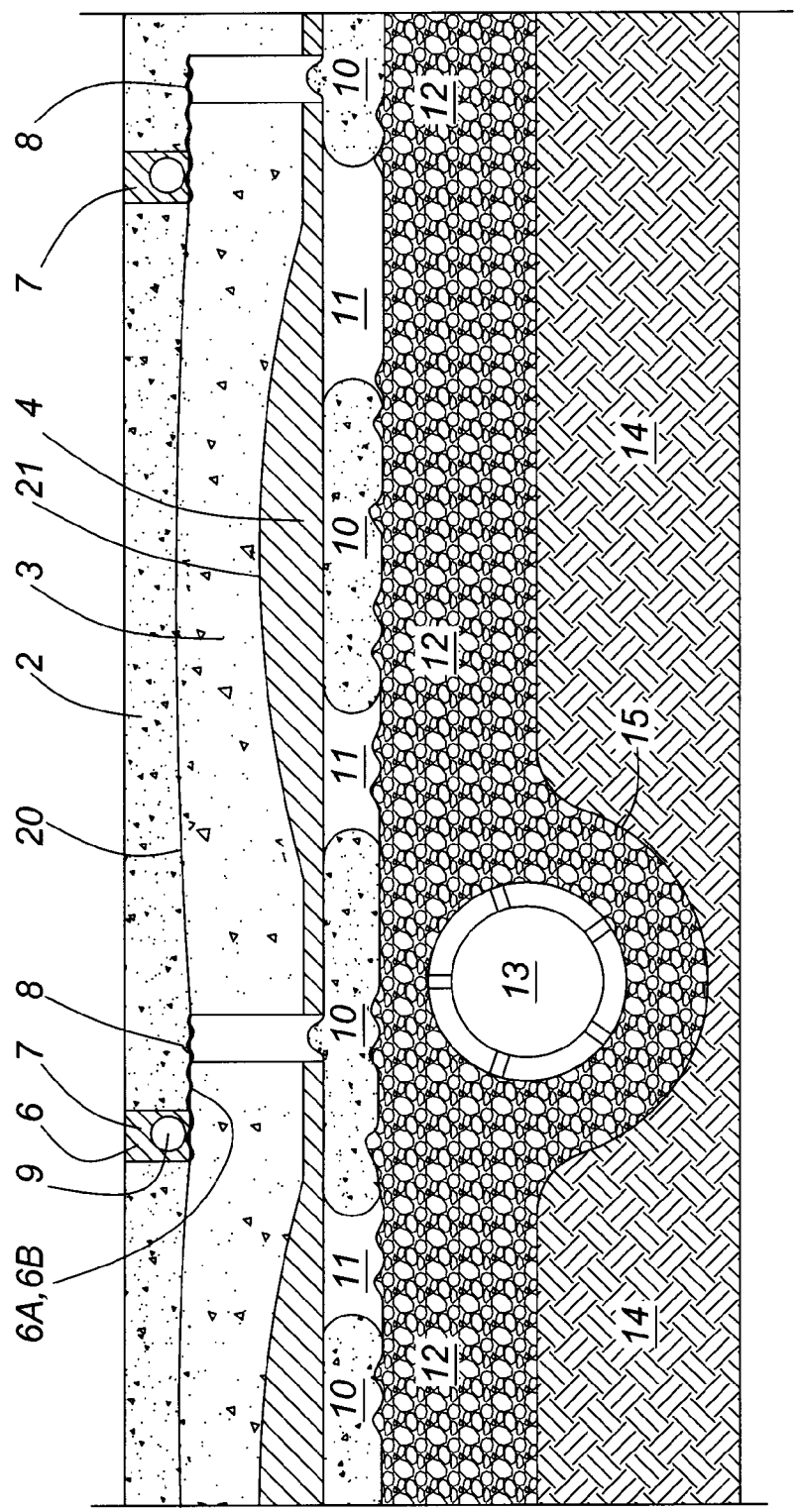
FIG. 5 is a cross-sectional side view through the joint between two tiles as depicted in FIG. 4, overlying an under floor drainage pipe shown in end view.

The interface 20 between the first cementitious layer 2 and second intermediate 3 layer is inwardly domed towards the first layer 2 to reduce the tendency for cracks to form, as shown in FIG. 5. Similarly and optionally, the interface 21 between the bottom layer 4 and the intermediate 3 layer is also inwardly domed.

An example of the casting procedure for making tiles can proceed as follows in a mold preferably—but not limited to the dimensions of 24×24×3½ inches:

1. Uniformly distribute one half gallon of Mix "B" in a mold and vibrate,
2. Add one gallon of Mix "A" over the Mix "B" to form layer 2 and vibrate making sure that steps present along the sides of the mold that produce the edges are filled.
3. Add 4 gallons of Mix "C" to the mold to form layer 3.
4. Compress Mix "C" to 1⅝ inch thickness at the edges forming a slight concavity of ⅜ inch in center of the intermediate layer 2 on a 24 inch square tile (creating a concavity at the interface with the top concrete layer 2 as well).
5. Spread uniformly ¾ gallon of Mix "D". Vibrate and trowel smooth. (See special procedure to redistribute particulates, below).
6. Cure—tiles can be autoclaved to speed curing.
7. Remove casting from form.
8. Install a vapor barrier 5, e.g. a Mylar vapor barrier with a reflective, mirror finish on the outside surface of the lower layer 4.
9. Package and inventory or ship.

A feature of the invention is the manner in which the components in the intermediate layer 3 are preferably distributed within that layer. This layer 3 contains a binder 30, generally a cementitious binder 30 such as mortar or Portland cement, plus particulate matter that is both lightweight 32 and of a heavier weight 33. The lightweight particulates 32 have a density generally less than that of water and are preferably in the form of pellets of polymeric foam such as polystyrene foam. The heavy aggregates 33 are typically sand or relatively fine crushed stone particles having the typical density of crushed stone as used in concrete.

The cementitious matrix 30 provided as a binder within the intermediate layer 3 is intended to generally envelop most or substantially all of the particulates 32, 33 contained therein. This matrix 30 provides a strength that would not otherwise be present if the intermediate layer 3 consisted purely of polymeric foam.

Within the intermediate layer 3, the light 33 and heavy 32 particulates may be distributed uniformly. However, according to a preferred version of the invention, heavy particulates 32 are displaced preferably towards the first layer 2, i.e. the layer that will eventually be the topside surface of a tile. This migration of heavy particles 32 will leave a greater concentration of light particulates 33 on the opposite side of the intermediate layer 3, towards what will eventually be the bottom-side surface of the tile. Optionally, these lightweight particles 33 may also be preferentially and positively displaced themselves towards the bottom-side surface using the technique described hereafter. This distribution is shown in FIG. 2 which represents a sample of the tile in its upright orientation. The following description addresses the casting of the tile in an inverted orientation within a mold.

This procedure of shifting the preferred distribution of particulate content 32, 33 in the intermediate layer 3 is achieved by applying a stiff cover sheet over the upper surface of the intermediate layer 3 once in place in the mold over the top layer of 2 and then applying a weight to develop a pressure on the mixtures of this combined intermediate 3 and top 2 layers underneath. The cover sheet is dimensioned to fit within the sides of the mold so that the full load of the weight rests on the two layers 2, 3 beneath. Vibration is then provided, optionally by vibrating the surface supporting the mold, until suspended air present in the cementitious component 30 of the intermediate layer 3 rises to the surface and a portion of the heavy particulate 32 sinks to the near the top layer 2. The presence of the weighted board limits the extent to which the light particulates 33 rise upwardly while the heavy particulates 32 sink downwardly. A controlled separation of the particulates 32, 33 in the intermediate layer 3 can be achieved depending on the time during which vibration is supplied.

The vibratory process reduces the content of air voids in the intermediate layer 3. This action not only minimizes the free air content in the intermediate layer 3 but also tends to shift the lightweight particulates 33 upwardly, towards the eventual bottom surface 21 of the intermediate layer 3. The vibratory process described above also produces an improved top surface 2 with an improved appearance at the mold-to-first-layer interface in the known manner.

The domed effect may be also be produced at the interface between the top normal to and intermediate 3 layers by the method of:
1. First applying the material to form the cementitious upper layer 2 over the bottom surface of a mold;
2. Applying a layer of material to form the intermediate layer 3 over the material of step 1;
3. Elevating the central portion of the material forming the intermediate layer 3 in step 2 with additional material used to form the intermediate layer 3, and
4. Depressing the elevated central portion of material forming the intermediate layer 3 with a planar surface so as to force material of the intermediate layer into the central portion of the upper layer.

If the central portion of the mold of supporting the upper layer is allowed to sag slightly by approximately 3/16 inch then the outer surface of the top layer 2 can also be provided with a slight dome of similar dimension.

This method conveniently will also displace material from the upper layer 2 outwardly towards its outer peripheral edge, increasing the thickness of the material of the upper layer 2 around its outer edges and thereby overlying the edges of the intermediate layer 3 along its outside boundaries.

A number of additives can be employed in the manufacture of floor tiles in accordance with the invention, including (but not limited to):
  (a) Form release agents like "Form Lease #46" available from Toronto Lube Service (used sparingly to coat the forms.) manufactured by Basf Chemicals;
  (b) Water reducing agent available from "Master Builders Technologies" Brampton Ontario. (eg 1.5 L. per cu. M.) A "water reducing agent" reduces the quantity of water required to achieve the desirable workable consistency for all cementitious components used in any of the cementitious layers of the tiles.
  (c) Air entrainment chemicals in the cementitious layers for protection against outside exposure. Including NBAE 90 @ 5-7%
  (d) Accelerator in the cementitious layers and binder to speed up curing time such as #7700 Glenium: 122HE (e.g. at the rate 1.5 per cu. M).

These additives should contribute to the consolidation and formation of an appropriate "clumping" consistency for the cementitious material, allowing it to retain its shape, and still be able to be compressed, and to set more rapidly. Controlled vibration of the setting tile, optionally combined with a degree of compression, produces a smoother, harder and more durable finish along the mold surface interface with limited segregation of the lightweight components 33.

Figure 8:
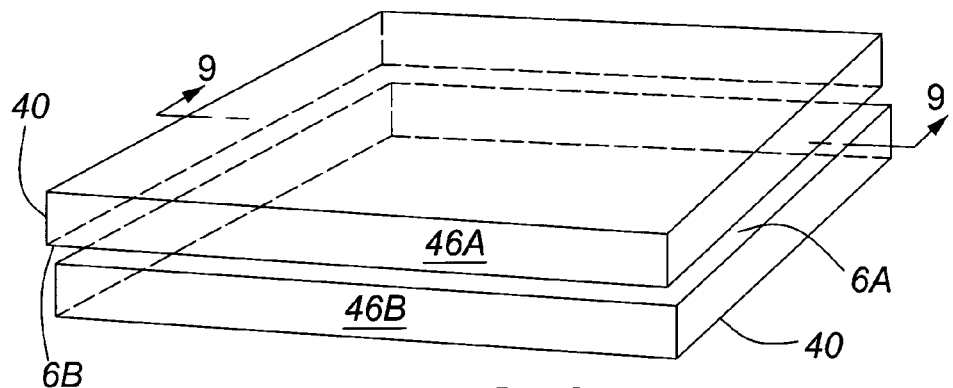
FIG. 8 is a perspective view of a reversible composite tile providing alternate, differing, top surfaces.
Figure 9:
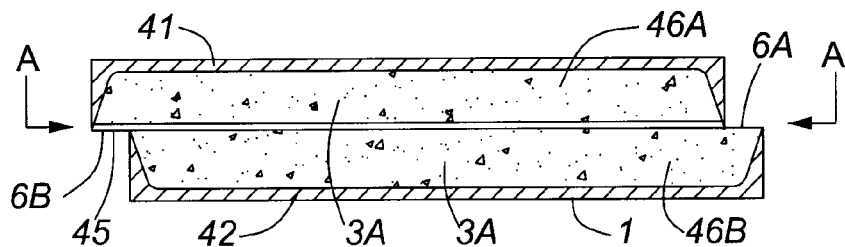
FIG. 9 is a cross-sectional view through the tile of FIG. 8.
Figure 10:
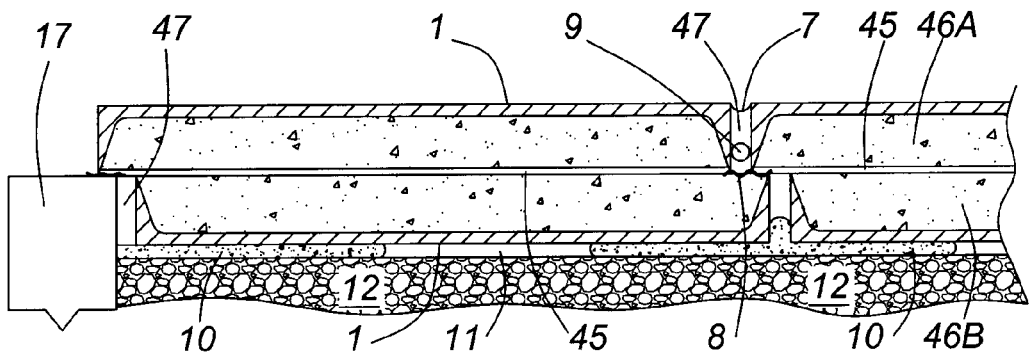
FIG. 10 is a cross-sectional view of a variant of the tile of FIG. 8 including a channel for reception of radiant heat tubing.

In FIGS. 8-10 a composite tile is formed of two joined halves 40 to provide a tile wherein both the top 41 and bottom 42 surfaces are provided by respective high strength cementitious layers that also include fibrous tensile reinforcement. Each half 40 can be cast in a similar form with fibrous reinforcement and different decorative outer surfaces 1 being formed on the respective, outer cementitious side 1 of each piece and with the balance of the mold filled with the same mix as for a standard "intermediate" layer 3A. These two halves 40 are then assembled to place their lighter weight "intermediate layer" 3A surfaces together, offset by preferably 1½ inches, to produce outward 6A and inward 6B steps on all four sides. The assembled halves 40 are bonded together to provide a single tile block.

The bonding layer 45 provided between the two halves 40 is preferably in the form of a water impervious central layer 45 using a waterproof binder such as hot melt glue, epoxy glue, or similar materials. In this variant, the intermediate lower density layer 3A is divided between upper 46A and lower 46B portions by the central layer 45 with the central layer 45 providing a continuous sheet interface between such upper 46A and lower 46B portions.

The composite tile of FIG. 8 as shown in FIG. 10 can include one or more preferably undercut channels 47 formed into one or both of the outer surfaces of the two halves 40 adjacent to an edge to receive a length of radiant heat tubing 9.

Without the presence of tubing 9 in an installation, adjacent tiles so dimensioned may be abutted along their lower portions, leaving a ¼ inch upper channel 6 to be filled with grout 7. The term "grout" 7 should be understood to include both the conventional thin, cementitious mortar used for filling joints in masonry as well as chemicals that solidify, such as polyurethanes, room temperature vulcanizing silicones, other elastomers, plastics, and the like that can function in the manner the equivalent to that of cementitious mortar. By allowing a slight gap to exist between otherwise abutting tile panel edges on installation, accurate alignment is made easier. This gap is sealed with an extended portion of the flexible caulk 8 applied between tile panels ledges 6A, 6B and compensates for slight movement between tiles, e.g. due to temperature variations.

In cases such as shown in FIG. 5 where a heating tubing 9 is to be installed on a floor, an upper channel 6 having a width of ½ inch or ⅝ inch may be provided in the upper surface 1 to receive tubing 9 of a similar dimension by only partially overlapping the ledges 6A, 6B.

Figure 3:
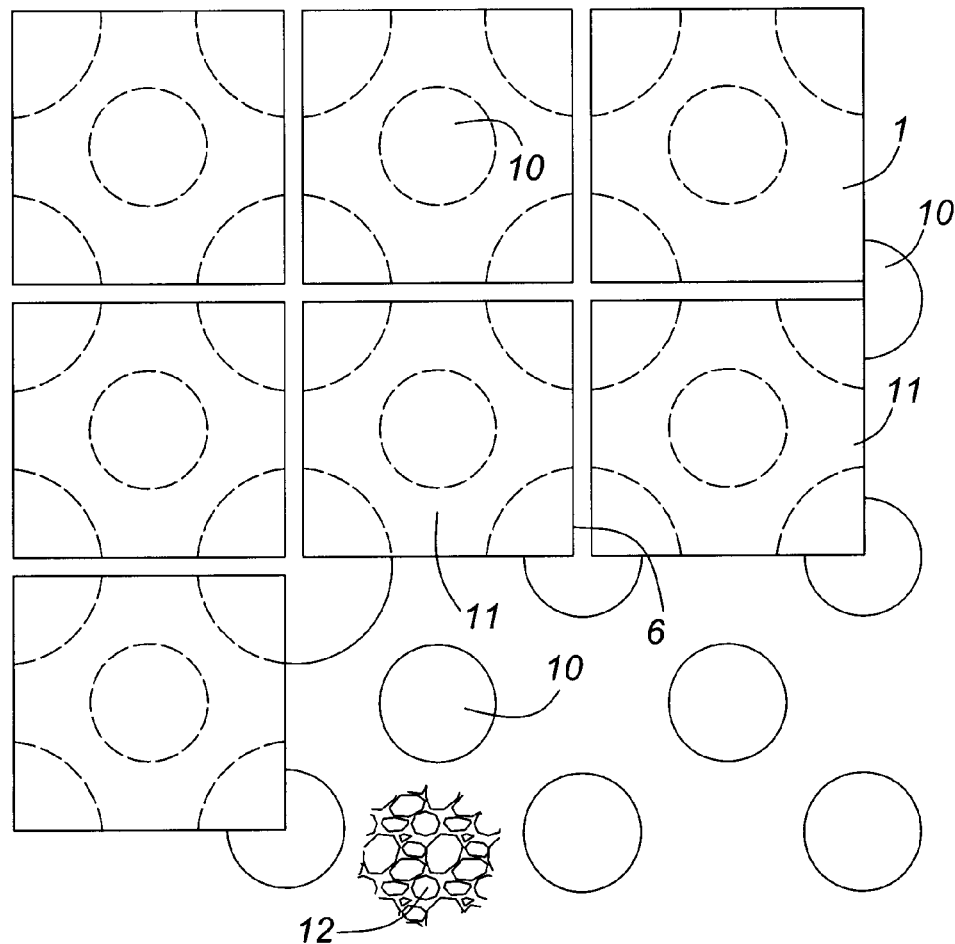
FIG. 3 is a plan view of a series of tiles of the type of FIG. 1 laid out on mortar pads to form a floor surface.

Relief angles may be provided for the edges defining the sides of the channel 6 to provide easy removal of castings from a mold. A ¾-inch top width and ½ inch bottom width for the channel 6 facilitates secure friction fit of ½ inch radiant heating tubes as well as providing space for the grout 7 used to fill panel joints As shown in FIG. 3 flooring panels having top surfaces 1 are laid contiguously on mortar pads 10 over an underlying prepared surface preferably covered by aggregate 12 which is permeable to vapor and moisture. Intermediate the mortar pads is an airspace 11 which is sufficiently continuous and interconnected to allow for the collection of under-floor vapors and gases.

Such pads 10 may be formulated by standard mortar mix. In such case, under the weight of the tiles and with tamping of the mortar pads 10 when moist during installation, the pads 10 will normally spread laterally by 50% to 100%, reducing in thickness to an approximate height of ⅜ of an inch but permissibly, optionally, ranging up to between ½ inch to 1 inch. This thickness then becomes the height of the airspace 11. The formulation for the mortar mix using standard cementitious materials may be extended by adding polystyrene beads e.g. in a 50:50 ratio. So extended, the mortar mix may be allowed to provide a higher height for the airspace 11 above the underlying prepared surface, preferably approximately ¾ inch. Plaster of Paris may be added to this mixture to speed its setting time, allowing earlier use of the floor surface.

Figure 4:
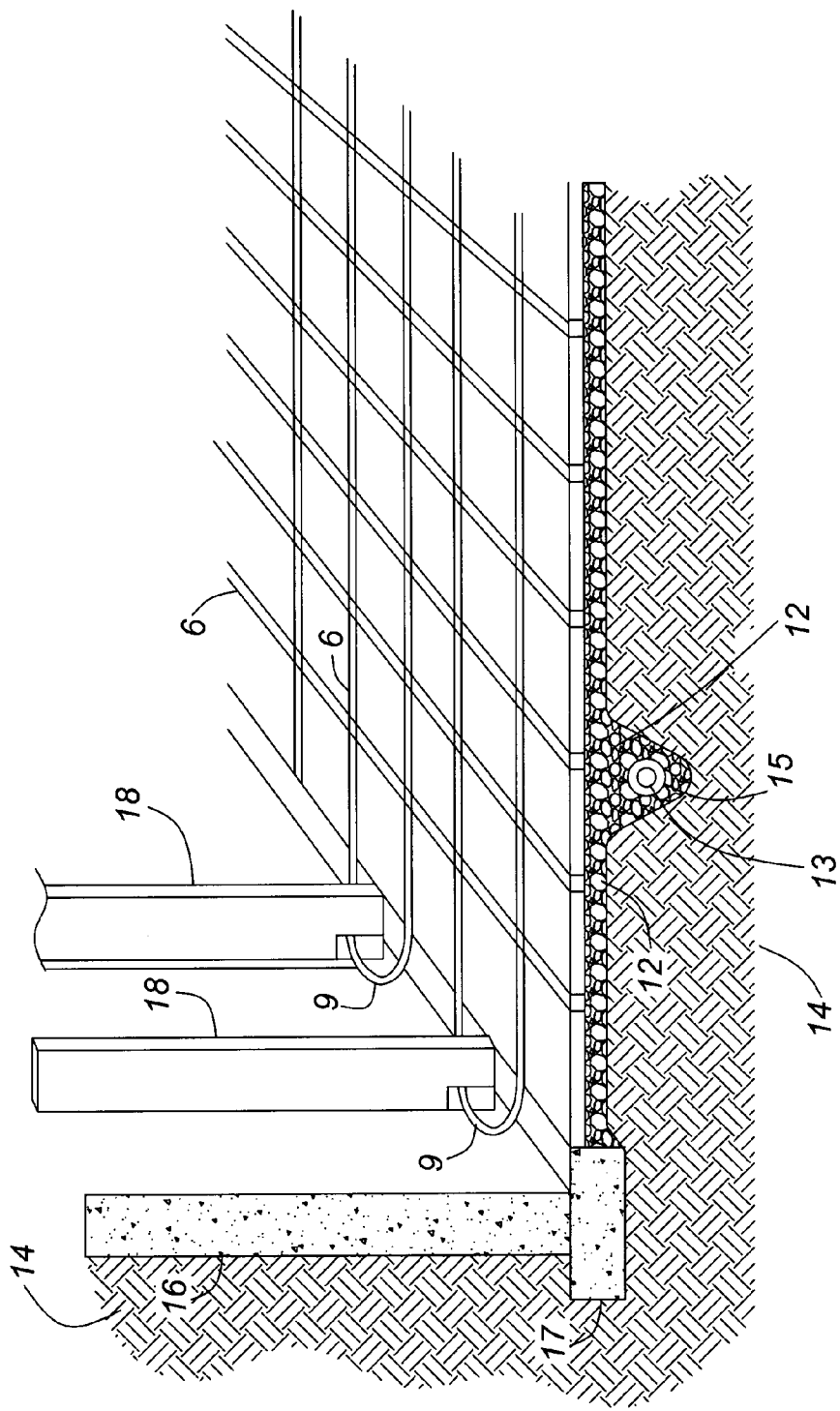
FIG. 4 is a cross-sectional perspective view of a basement with a typical wall and a floor made up of tiles in accordance with FIG. 1.

In FIG. 4 the tiles of FIG. 1 are shown laid-out as the basement floor surface of a structure. For convenience of depiction, the mortar pads 10 and airspace 11 are not shown. The basement wall 16 on a foundation 17 with studs 18 is shown as retaining earth 14 outside of the structure. Beneath the floor is a trench or trough 15 which contains a water drainage pipe 13 embedded in aggregate 12 to permit drainage. The channels 6 formed between adjacent tiles are occupied by radiant heating tubing 9 which forms loops adjacent to the studs 18 within the wall cavity created when a wall covering, e.g. wallboard sheeting (not shown) is applied to the studs 18. While the tiles are showing as having crisscross channels 6, only tubing 9 in one set of parallel channels 6 as depicted, the other crossing tubing being omitted for clarification In FIG. 5 details of the positioning of the tubing 9 in the channels 6 is shown. At the over-lapping interfaces of the ledges 6A, 6B, a sealant 8 typical as used in the industry is applied, preferably extending completely under the tubing 9 in order to provide a "cushioning effect" for the tubing 9. A grout 7 is then applied over the thermal piping 9.

Figure 6:
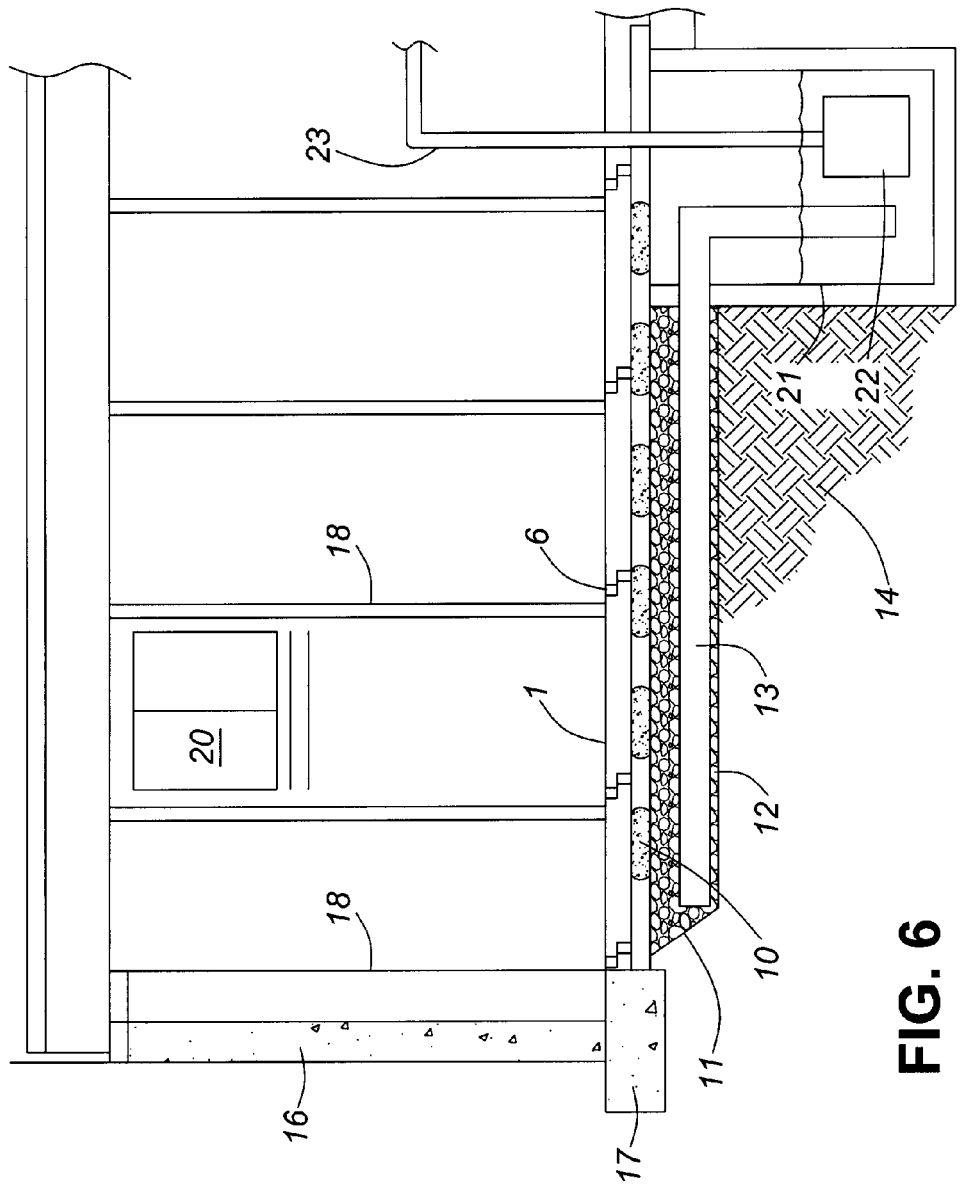
FIG. 6 is a cross-sectional side view of the basement of FIG. 4 showing the under floor drainage pipe of FIG. 5 leading to a sump pump.
Figure 7:
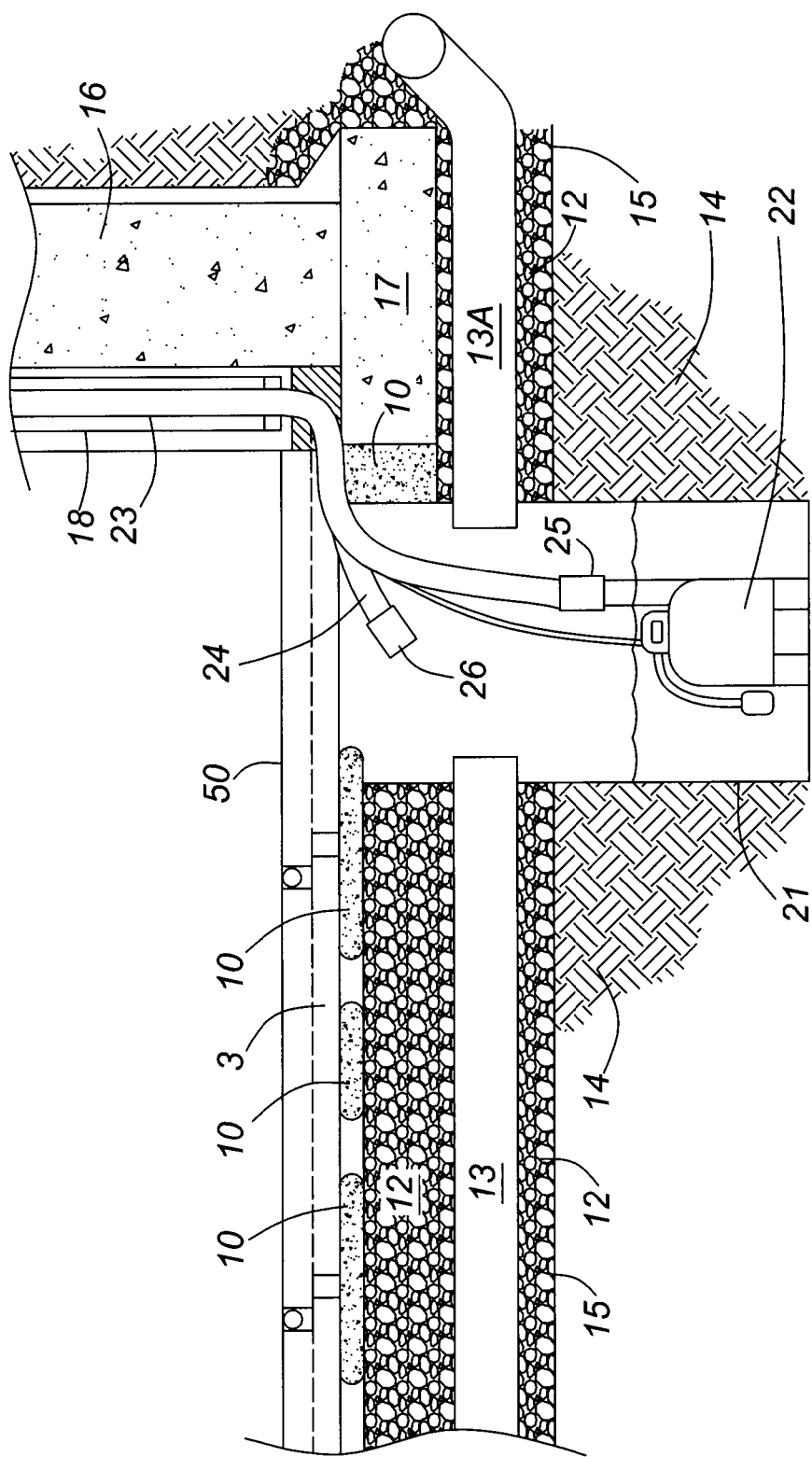
FIG. 7 is a cross-sectional side view of a detail of a variant on the sump pump arrangement depicted in FIG. 6.

The water drainage pipe 13 is shown in FIG. 6 in profile view leading to a sump well 21 containing a sump pump 22. The pump 22 expels water out of the structure through water outlet discharge tubing 23. Conveniently, using the same routing as the water outlet tubing 23, a gas exhaust fan 26 exhausts gas and vapors from the airspace 11 through an exhaust gas outlet tubing 24. The gas exhaust outlet tubing can alternately be connected to an exhaust fan, an HRV—Heat Recovery Ventilator—, positioned elsewhere or directly vented to outside the building. This is shown in greater detail in FIG. 7 which also depicts a pipe 13A transferring water from an exterior weeping drainage pipe to the sump well 21 for evacuation from the structure. Also shown in FIG. 7 is the feature of having a single, sealed, removable tile 50 located over the sump well 21 to provide access to the sump pump 22.

Further improvements include
(a) Identical 1⅝ inches deep simplified ABS forms will cast both top and bottom halves.
(b) An improved, very effective, vapor barrier can be spray painted on, shrink-wrapped, vacuum formed, melted in place and/or, with the two piece composite variant, glued to fasten the two pieces together.
(c) The offset may be increased, from 1 inch wide×1¼ inch thick, to 1½ inches wide×1⅝ inches thick. This makes a better fit to the footing by overlapping it as in FIG. 8, or to a 45 deg. slope if such a slope is present in the footing. By increasing the lip thickness the joint strength is increased, and radiant heat installation is improved through the deeper grout joint.
(d) By adding a ¼ inch radius to the bottom layer 4 edges and the four corners and a larger relief angle to all four skies, casting removal and appearance will be improved.
(e) By reducing the size from 3½×24×24 inches the weight can be reduced to under 65 lbs. This permits one man to handle them. Radiant heat distribution is improved by reducing the spacing between tubing in the channels 6 1¼ to 2½ inch Labour savings are achieved for both manufacturing and installation since both may be addressed with one-man handling.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as follows:

1. A floor overlying an underlying support surface in the form of a prepared earth base or layer of aggregate or gravel, the floor comprising rigid flooring panels, the flooring panels each comprising:
   1) a cementitious upper layer providing a durable upper surface of a given density suitable for use as part of a floor surface;
   2) an intermediate lower density layer beneath the upper layer containing lower density particulate material bonded together by a higher density binder that forms a binder matrix around the low density particulate material containing and fixing the position of the low density particulate material, the overall average density of the intermediate layer being less than the average density of the upper layer, and
   3) a tensile constraining lower layer located beneath and on the underside of the intermediate layer to cover and contain the intermediate layer, there being present between the flooring panels and the support surface localized deposits of supporting cementitious mortar placed on the underlying and in contact with an underside surface of the flooring panels so as to that provide an interconnected airspace there between for the containment of under-floor vapors and gases wherein the flooring panels are provided with interfitting edges in the form of a shiplap joint having ledges to permit a plurality of such flooring panels to be assembled contiguously to each other with the overlapping ledges providing over-lapping interfaces along such joints by lowering such panels into place.

2. The floor as in claim 1 wherein the flooring panels have edges and the flooring panels are laid so that the edges of individual flooring panels are contiguous to the edges of other adjacent flooring panels, at least some of such edges meeting to form corners at the junctions of four flooring panels wherein the deposits of cementitious mortar are located beneath the corners of the flooring panels present at such junctions providing shared support to the corners present at such junctions.

3. The floor as in claim 2 within a structure in combination with a gas venting system connected to the airspace to vent vapor and gases contained therein outside the structure.

4. A floor as in claim 1, the flooring panels further comprising an indentation along at least one of the interfitting edges, such indentation being dimensioned so that, when the flooring panels are laid to form a floor with flooring panel edges adjacent to each other, an upwardly directed channel with at least one under-cut sidewall is formed adjacent to the boundary between adjacent flooring panels, the channel being dimensioned to accommodate thermal radiant tubing installed therein for circulation of a heat-exchange fluid, such tubing being covered by a grout, thereby allowing the floor to function in the manner of a hydronic floor to provide radiant heating or cooling.

5. A floor as in claim 2 wherein the basement flooring panels range from $2^{5}/_{16}$ inches up to $5^{1}/_{4}$ inches in thickness.

6. A floor as in claim 1 wherein the binder for the intermediate layer is a cementitious binder and the low density particulate material comprises pellets of expanded polymeric resin.

7. A floor as in claim 6 wherein the pellets of expanded polymeric resin comprise expanded polystyrene beads and the lower layer includes a cementitious binder.

8. A floor surface as in claim 7 wherein the airspace is between $3/8$ inch to 1 inch in thickness.

9. A floor as in claim 7 wherein the lower layer is reinforced by tension-bearing reinforcing fibers embedded therein.

10. A floor as in claim 1 wherein the density ratio of the intermediate layer based on its average density with respect to the average density of the upper layer is in the range of between 25% to 55%.

11. A floor as in claim 10 wherein the density ratio of the intermediate layer with respect to the average density of the upper layer is in the range of between 35% to 45%.

12. A floor as in claim 1 wherein the interface between the upper layer and the intermediate layer is upwardly domed towards the upper layer to reduce the tendency for cracks to form in the upper layer when a load is applied to the upper surface of the flooring panel.

13. A floor as in claim 1 wherein:
1) the lower layer of the flooring panels is a cementitious layer providing a durable surface of a given density;
2) the upper and lower layers of the flooring panels both contain tension-bearing reinforcing fibers embedded therein to reinforce such layers;
3) the intermediate lower density layer of the flooring panels is divided between upper and lower portions by a water impervious central binder layer in the form of a continuous sheet interface of non-cementitious adhesive material coupling the upper on lower portions together.

14. A floor as in claim 1 wherein the interface between the intermediate layer and the lower layer of the flooring panels is upwardly domed towards the upper layer to reduce the tendency for cracks to form in the intermediate layer when a load is applied to the upper surface of the flooring panel.

15. A floor as in claim 7 wherein the cementitious upper layer and the cementitious binder for the intermediate layer of the flooring panels both comprise Portland cement.

16. A floor as in claim 15 wherein the lower surface of the lower layer of the flooring panels is covered by a vapor barrier.

17. A method of preparing a floor overlying an underlying support surface in the form of a prepared earth base or a layer of aggregate or gravel, by laying an array of flooring panels on said support surface, each of said flooring panels having edges and corners and shaped to provide, when finally laid, contiguously positioned flooring panels, the flooring panels comprising:
1) a cementitious upper layer providing a durable upper surface of a given density suitable for use as part of a floor surface;
2) an intermediate lower density layer beneath the upper layer containing lower density particulate material bonded together by a higher density binder forms a binder matrix around the low density particulate material containing and fixing the position of the low density particulate material, the overall average density of the intermediate layer being less than the average density of the upper layer,
3) a tensile constraining lower layer located beneath and on the underside of the intermediate layer to cover and contain the intermediate layer, and
4) the edges being interfitting edges in the form of a shiplap joint having ledges to permit a plurality of such flooring panels to be assembled contiguously to each other with the overlapping ledges providing over-lapping interfaces along such joints the method comprising the steps of:
a) depositing on the support surface localized deposits of cementitious mortar at locations corresponding to corners on said flooring panels, the deposits being dimensioned and located to provide an airspace between such deposits,
b) laying one first line of flooring panels in a series with corners of each of the flooring panels supported on at least some of the localized deposits of mortar,
c) positioning a second line of further flooring panels above and in alignment with said first line of flooring panels with the corners of the further panels located above and positioned to be laid over at least some of the previously deposited localized deposits of mortar, wherein edges of the second line of flooring panels are oriented to be aligned with the underneath edges of the flooring panels of the first line of flooring panels, and
d) lowering the second line of flooring panels onto the deposits of mortar to form the floor of contiguously positioned flooring panels with the overlapping ledges of the respective flooring panels engaged along their shiplap joints to provide the over-lapping interfaces along such joints.

18. A method as in claim 17 wherein at least some of the flooring panels further comprise an indentation along at least one of their respective interfitting edges, such indentation being dimensioned so that, when the flooring panels are laid to form a floor with flooring panel edges adjacent to each other, an upwardly directed channel with at least one undercut sidewall is formed adjacent to the boundary between adjacent flooring panels, the channel being dimensioned to accommodate thermal radiant tubing installed in the channel for circulation of a heat-exchange fluid therein, such method comprising the further steps of:
1. positioning the flooring panels comprising an indentation to form such channel,
2. placing thermal radiant tubing in such channel, and
3. covering such tubing by a grout to thereby allow the floor to function in the manner of a hydronic floor, providing radiant heating or cooling.

* * * * *